Patented Jan. 14, 1930

1,743,744

UNITED STATES PATENT OFFICE

HENRY F. WINKELMANN, OF BILLINGS, MONTANA

COMPOSITION OF MATTER FOR USE IN BUILDING CONSTRUCTION

No Drawing.  Application filed April 5, 1927. Serial No. 181,273.

This invention relates to a composition of matter which can be used for numerous purposes, such as the formation of roofing, flooring, wall coatings, sound deadening partitions, and the like in building constructions and which is also valuable as an insulating medium and can, therefore be used in the construction of conduits, insulators, etc.

It is an object of the invention to provide a cheap but efficient composition which, while in use, will not crack when subjected to low temperatures nor "run" when subjected to high temperatures.

A further object is to provide a composition which constitutes an efficient heat and electric insulating means which is fireproof.

A further object is to provide a preparation of this nature which can be easily worked and which, because of its characteristics, is particularly suitable for use as a covering for inclined roofs.

Another object is to provide a composition of matter the principal ingredient or base of which is formed of a material which has heretofore been practically a waste product.

With the foregoing and other objects in view which will appear as the description proceeds, the invention consists of the following ingredients substantially in the proportions stated, to wit Zonolite _____ 30% by volume
Ground cinders or ground
  burnt clay_____ 50% by volume
Asphalt _____ 20% by volume In preparing this composition of matter there is first procured a natural product known as phlogopite which is found in large quantities in northwestern Montana. This material as mined, resembles slate or slag such as found in anthracite coal and is of a greenish flaky appearance. This phlogopite is treated with heat at approximately 2,500 degrees F., this intense heat serving to change the characteristics of the material so that it is increased in volume approximately fifteen times and forms a yellow or gold appearing flaky substance which is extremely light and has some of the characteristics of mica and some of the characteristics of asbestos but is not the same as either. The material thus produced constitutes the zonolite constituting one of the ingredients herein set forth. The zonolite, when mixed with the noncombustible filler consisting of ground cinders or ground burnt clay, and with the binder consisting of asphalt provides a cheap plastic material having all of the advantages hereinbefore pointed out. The zonolite is a very light substance which will expand and contract readily and is pliable in the asphalt binder.

What is claimed is:

A roofing composition including the following ingredients substantially in the proportions stated, to wit, zonolite, 30% by volume; asphalt, 20% by volume; and crushed burnt clay, 50% by volume.

In testimony that I claim the foregoing as my own, I have hereto affixed my signature.

HENRY F. WINKELMANN.